(12) United States Patent
Yamada (10) Patent No.: US 7,162,959 B2
(45) Date of Patent: Jan. 16, 2007

(54) TRANSPORTATION SYSTEM

(75) Inventor: Saburo Yamada, Sakai (JP)

(73) Assignee: Senyo Kogyo Co., Ltd., Osaka (JP)

( * ) Notice: Subject to any disclaimer, the term of this patent is extended or adjusted under 35 U.S.C. 154(b) by 0 days.

(21) Appl. No.: 10/528,122

(22) PCT Filed: Sep. 12, 2003

(86) PCT No.: PCT/JP03/11749

§ 371 (c)(1),
(2), (4) Date: Mar. 16, 2005

(87) PCT Pub. No.: WO2004/026654

PCT Pub. Date: Apr. 1, 2004

(65) Prior Publication Data

US 2006/0042497 A1 Mar. 2, 2006

(30) Foreign Application Priority Data

Sep. 17, 2002 (JP) ............................. 2002-270653

(51) Int. Cl.
*B60L 13/06* (2006.01)
(52) U.S. Cl. ..................................... 104/284
(58) Field of Classification Search ............. 104/88.01, 104/89, 90, 281, 282, 283, 284
See application file for complete search history.

(56) References Cited

U.S. PATENT DOCUMENTS

| 6,024,647 | A | * | 2/2000 | Bennett et al. ................ 472/43 |
| 6,354,223 | B1 | * | 3/2002 | McKoy ......................... 104/72 |
| 6,363,857 | B1 | * | 4/2002 | Kauffman ................. 104/88.01 |
| 6,782,831 | B1 | | 8/2004 | Yamada |
| 2001/0015148 | A1 | | 8/2001 | Mckoy |

FOREIGN PATENT DOCUMENTS

| DE | 3840224 A1 | 6/1989 |
| EP | 1 172 273 A1 | 1/2002 |
| EP | 1172273 * | 1/2002 |
| JP | 57-003357 | 1/1982 |
| JP | 59-066659 | 4/1984 |

(Continued)

OTHER PUBLICATIONS

International Search Report for PCT/JP03/11749 mailed Dec. 16, 2003.

(Continued)

*Primary Examiner*—S. Joseph Morano
*Assistant Examiner*—Robert J. McCarry, Jr.
(74) *Attorney, Agent, or Firm*—Rader, Fishman & Grauer PLLC (57) ABSTRACT

A transportation system is provided, in which a light-weight, small-sized vehicle can be used. This transportation system comprises a rail extending between stations, vehicle capable of running on the rail and carrying a drive unit, first zone for accelerating the vehicle from a stopped condition to a required speed by a propulsion force supplied from a propulsion supply unit provided from one of the stations toward the other station by a predetermined distance, and a second zone not having the propulsion supply unit, in which the vehicle accelerated in the first zone travels on the rail by the propulsion force supplied from the drive unit.

5 Claims, 5 Drawing Sheets

FOREIGN PATENT DOCUMENTS

| | | |
|---|---|---|
| JP | 60-99286 | 3/1985 |
| JP | 63-022275 | 1/1988 |
| JP | 63-15084 | 4/1988 |
| JP | 2002-029414 A1 | 1/2002 |
| JP | 2002-087255 A1 | 3/2002 |
| WO | WO 98/45007 | 10/1998 |

OTHER PUBLICATIONS

European Search Report, Application No./Patent No.: 03797598.4-2422 PCT/JP0311749, dated Nov. 8, 2005.

Japanese Examination Report for Patent Application 2002-270653 dated May 2, 2006.

* cited by examiner

TRANSPORTATION SYSTEM

TECHNICAL FIELD

The present invention relates a transportation system for passengers or cargos, and particularly a monorail system where a small-sized, light-weighted vehicle can be used.

BACKGROUND ART

In the past, monorail has been widely used as a transportation system connecting between two sites spaced by a short to middle distance (for example, 5 to 20 km) such as between residential and industrial districts or between downtown and airport. In the monorail, since a rail is supported by bridge piers constructed on the ground at a required interval, there are advantages that the degree of freedom of design of transportation route is high, and the construction cost can be saved due to a reduced land area for construction, as compared with the case of laying rails for a regular railway.

On the other hand, a large drive unit is usually needed to accelerate a vehicle from a stopped condition to a required speed. When such a large drive unit is mounted in the vehicle, it leads to increases in size and weight of the vehicle. Consequently, huge bridge piers are needed to support the rail and the vehicle. This becomes a cause of lowering the degree of freedom of design with respect to the construction of a monorail system. Furthermore, as larger the land area needed to construct the monorail system, the construction cost also becomes higher. Thus, the conventional transportation system such as monorail still has plenty of room for improvement.

SUMMARY OF THE INVENTION

In view of the above-described problems, a primary concern of the present invention is to provide a transportation system having an advantage that a small-sized, light-weighted drive unit can be used as the drive unit mounted on a vehicle to achieve reductions in size and weight of the vehicle, thereby saving the cost for constructing the transportation system, and increasing the degree of freedom of design.

That is, the transportation system of the present invention for allowing the vehicle to run between stations on a track is characterized by comprising an acceleration zone for accelerating the vehicle by a propulsion supply unit provided in the vicinity of the station, and an autonomous traveling zone for allowing the vehicle accelerated in the acceleration zone to travel on the track in an autonomous manner without the propulsion supply unit.

According to the above transportation system of the present invention, since the vehicle is accelerated by the propulsion supply unit provided in the vicinity of the station, it does not need to carry a large drive unit having the capability of providing a large propulsion force to accelerate the vehicle from a stopped condition to a required speed. Consequently, remarkable reductions in size and weight of the vehicle can be achieved. Therefore, even when a sufficient land area for constructing huge bridge piers for a conventional vehicle carrying the large drive unit thereon is not secured, the transportation system of the present invention can be actualized by constructing relatively small bridges piers for the small-sized, light-weighted vehicle. Thus, the present invention provides an increased degree of freedom of design with respect to the construction of the transportation system. Furthermore, impossible to overlook is a considerable reduction in the construction cost.

In the present invention, it is preferred that the propulsion supply unit of the transportation system is a linear-type accelerator for accelerating the vehicle by providing a propulsion force from a first magnet located on the track to a second magnet mounted on the vehicle. In this case, it is possible to smoothly accelerate the vehicle from the stopped condition to the required speed through a relatively short distance, and therefore give a comfortable ride quality to the passengers.

In addition, it is preferred that the propulsion supply unit is the coaster-type accelerator comprising an auxiliary track formed at an uphill gradient in the vicinity of the station, and a lifter for lifting the vehicle on the auxiliary track, which is provided such that when the vehicle lifted on the auxiliary track is released, it is accelerated by gravitation. In particular, when the propulsion supply unit provided in the vicinity of one of the stations is the linear-type accelerator described above, and the propulsion supply unit provided in the vicinity of the other station is the coaster-type accelerator described above, the passengers are allowed to enjoy a moderate entertainment provided by different accelerating methods in approach and backhaul routes between the stations. Therefore, this transportation system is particularly suitable to transfer the passengers in amusement parks and theme parks.

As a particularly preferred embodiment of the present invention, the transportation system has a rail extending between stations and a vehicle movable on the rail and carrying a drive unit, and is characterized by comprising a first zone for accelerating the vehicle from a stopped condition to a required speed by a propulsion force supplied from the propulsion supply unit provided from one of the stations toward the other station by a predetermined distance, and a second zone not having the propulsion supply unit, in which the vehicle accelerated in the first zone travels on the rail by the propulsion force supplied from the drive unit.

In the above-described transportation system, it is particularly preferred that the propulsion supply unit is the linear-type accelerator for accelerating the vehicle by the propulsion force supplied from a fixed magnet located along the rail to a movable magnet mounted on the vehicle, and the drive means comprises a wheel driven by a motor mounted on the vehicle, and an auxiliary rail formed in the second zone in parallel with the rail such that the wheel travels thereon.

Additional features and advantages of the present invention will be more clearly understood from the best mode for carrying out the invention described below.

BEST MODE FOR CARRYING OUT THE INVENTION

A transportation system of the present invention is explained in detail according to preferred embodiments, referring to the attached drawings.

First Embodiment

Figure 1:
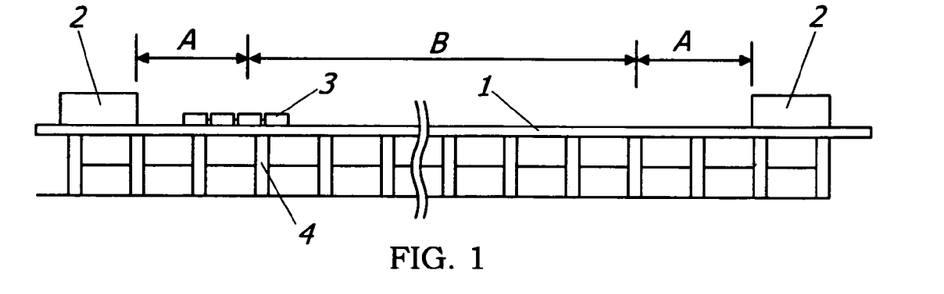
FIG. 1 is a schematic diagram of a monorail system according to a first embodiment of the present invention.
Figure 2:
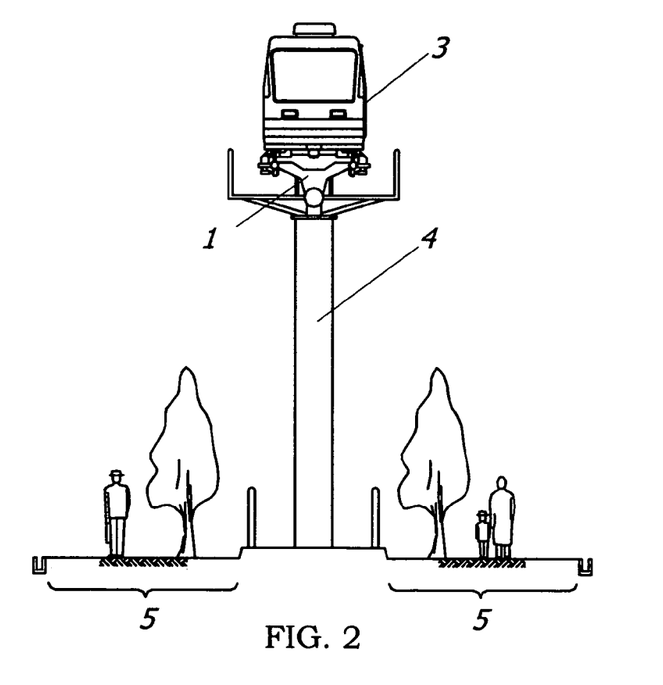
FIG. 2 is a front view of the monorail system.
Figure 3:
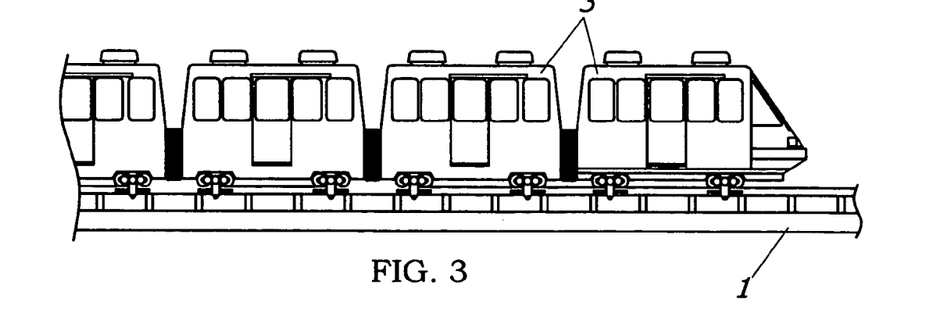
FIG. 3 is a side view of a vehicle used in the monorail system.

As a preferred embodiment of the transportation system of the present invention, a monorail system is explained. In this monorail system, as shown in FIGS. 1 to 3, a vehicle 3 is allowed to run between stations 2 on a rail 1 as a single track supported by bridge piers 4. In a first zone A, the vehicle 3 is accelerated from a stopped condition to a required speed by a propulsion force supplied from a propulsion supply unit, which is located from one of the stations toward the other station by a predetermined distance. In a second zone B, the vehicle 3 travels by use of a drive unit mounted thereon.

In the present embodiment, a liner-type accelerator is used as the propulsion supply unit disposed in the first zone A. That is, the rail 1 extends horizontally in the first zone A, and a fixed magnet 13 is disposed along the rail 1. The fixed magnet 13 gives the propulsion force to a movable magnet 34 mounted on the vehicle 3 to accelerate the vehicle 3, as shown in FIG. 4.

Figure 4:
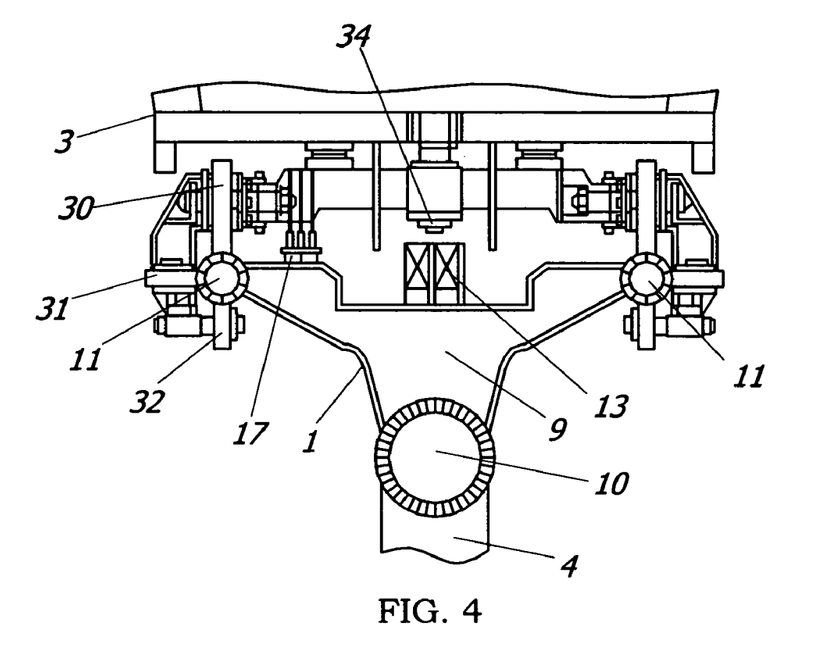
FIG. 4 is a cross-sectional view of a first zone of the monorail system.

In FIG. 4, the rail 1 is mainly composed of a main girder 10, pair of round pipe rails 11 made of a steel and disposed at upper right and left sides of the main girder 10, and a coupling member 9 for coupling between the main girder 10 and these pipe rails 11. The vehicle 3 has upper wheels 30, side wheels 31 and lower wheels 32, which respectively contact the pipe rails 11 from the upper, side and lower directions to be rotatable on the pipe rails 11. The upper wheels 30 are main wheels for supporting the weight of the vehicle 3. The side wheels 31 are side guide wheels. The lower wheels 32 are lift-off preventing wheels. Thus, since each of the pipe rails 11 is caught by the upper, side and lower wheels (30, 31, 32), it is possible to prevent derailment of the vehicle 3 at steep slope and sharp curve locations, and ensure the safety of the transportation system. The upper, side and lower wheels (30, 31, 32) may be made of an elastic material such as urethane. In this case, a comfortable ride quality can be achieved by preventing vibrations of the vehicle 3 traveling on the rail 1. In addition, it is effective to prevent noise pollution.

Figure 5:
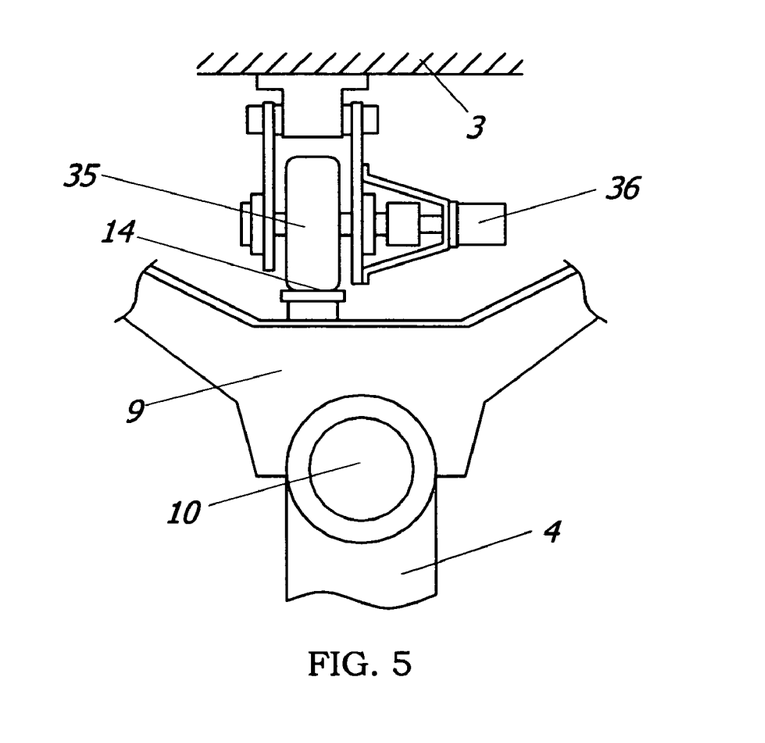
FIG. 5 is a cross-sectional view of a second zone of the monorail system.
Figure 6:
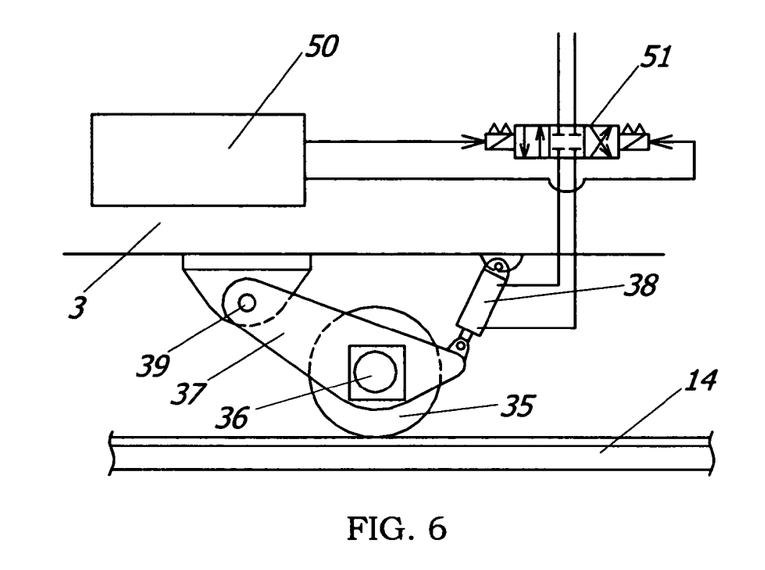
FIG. 6 is a partially side view of the vehicle traveling in the second zone.

As shown in FIG. 5, the vehicle 3 has the drive unit for allowing the vehicle to travel in an autonomous manner. This drive unit is composed of a small-sized motor 36 driven by electric power, drive wheel 35 rotated by the motor 36, and a hoisting mechanism for moving the drive wheel 35 up and down. As shown in FIG. 6, the hoisting mechanism comprises an arm 37, and an actuator 38 such as an air cylinder and a hydraulic cylinder used to pivot the arm 37 about a shaft 39. The small-sized motor 36 and the drive wheel 35 are supported by the arm 37. In this case, when the drive wheel 35 is moved down by the hoisting mechanism, it contacts an upper surface of an auxiliary rail 14 provided on the top surface of the coupling member 9, so that the vehicle 3 can travel on the auxiliary rail 14 by driving the small-sized motor 36 to rotate the drive wheel 35. This drive unit may be formed such that after the vehicle 3 accelerated to the required speed in the first zone A comes in the second zone B and travels on the rail 1 by inertia, autonomous traveling of the vehicle 3 is actualized by contact of the drive wheel 35 with the auxiliary wheel 14 when the traveling speed becomes lower than a predetermined value.

In FIG. 6, the numeral 50 designates a speed detector. The traveling speed of the vehicle 3 can be detected by a pulse signal detector or an encoder of the speed detector 50. When the traveling speed becomes lower than the predetermined value, a valve 51 is switched, so that the drive wheel 35 is moved down from a lifting (lift-off) position by the actuator 38 to press the drive wheel 35 against the auxiliary rail 14. Consequently, the vehicle 3 can travel on the rail 1 by a running torque of the small-sized motor 36. On the contrary, when the traveling speed of the vehicle 3 is equal to or more than the predetermined value, the drive wheel 35 is left from the auxiliary rail 14 by the actuator 38, so that the vehicle 3 travels on the rail 1 by inertia force. Thus, according to the propulsion force supplied in the first zone A, the vehicle 3 can travel by inertia. Alternatively, according to the propulsion force obtained in a downslope region, the vehicle 3 can travel by inertia. Therefore, it is possible to save electric power consumption needed to operate the monorail system.

As a modification of the present embodiment, when accelerating the vehicle 3 by using both of the propulsion force supplied in the first zone A by the linear-type accelerator and the propulsion force supplied by the drive unit, it is possible to decrease the length of the first zone A. In addition, since the liner-type accelerator formed along the rail 1 can be scaled down, it is possible to further downsize the monorail system.

Thus, it is not necessary for the vehicle 3 to carry a large drive unit having the capability of providing an output power for accelerating the vehicle 3. In other words, it is good enough to carry a relatively small drive unit having the capability of providing an output power for keeping the traveling speed of the vehicle 3. Therefore, as compared with a conventional monorail system not having the acceleration zone such as the first zone A, a downsized motor can be used as the drive unit mounted on the vehicle in the monorail system of the present invention. As a result, it is possible to achieve remarkable reductions in size and weight of the vehicle.

In FIG. 4, the numeral 17 designates a power supply unit for the vehicle 3. This power supply unit 17 is provided on the coupling member 9, and electric power can be supplied to the vehicle through a current collector (not shown) of the vehicle. In addition, when the electric power supply unit 17 is located on the rail 1 in the station area, and a battery (not shown) is mounted on the vehicle 3, the battery can be charged through the current collector at the stopped condition. For example, an interior light or an air conditioner may be operated by using the electric power supplied from the charged battery.

Figure 7:
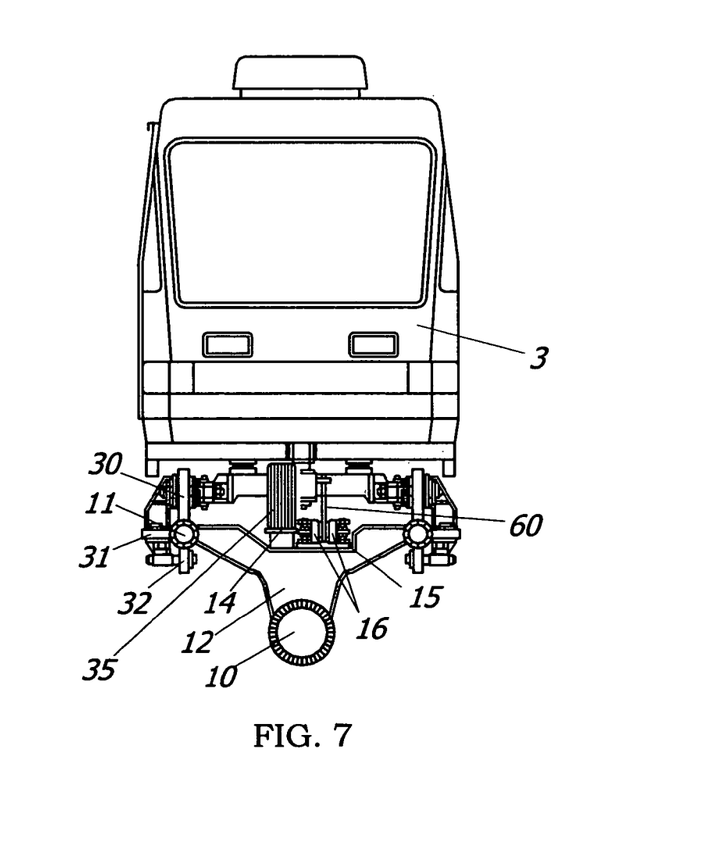
FIG. 7 is a cross-sectional view of a braking device of the monorail system.

As shown in FIG. 7, a braking device of the vehicle 3 of the present embodiment comprises a brake plate 60 provided at a lower portion of the vehicle 3, and a brake unit 15 provided on the top surface of the coupling member 9. The brake unit 15 has a pair of brake pads 16 for stopping the vehicle 3 by sandwiching the brake plate 60 therebetween. The braking device is not limited to this embodiment. For example, a downsized motor with a brake, or a brake attached to the drive wheel 35 may be used.

In addition, the vehicle 3 has a flat floor designed in a barrier free manner. In this case, it is possible to prevent a situation that the passenger stumbles in the vehicle, and improve the safety of the monorail system. In addition, since children and elder people can safely ride on the vehicle, there is a further advantage of expanding the age group of passengers using the transportation system.

Second Embodiment

Figure 8:
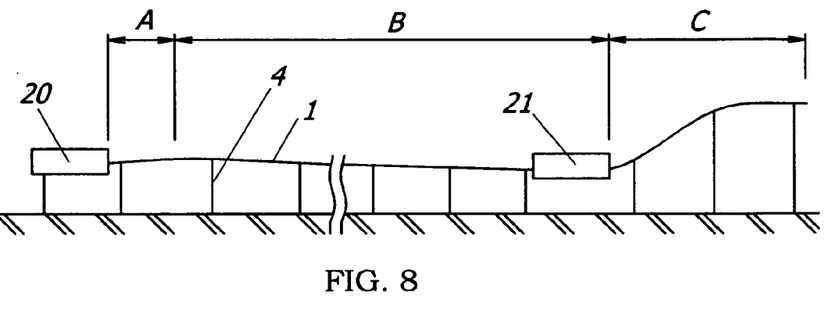
FIG. 8 is a schematic diagram of a monorail system according to a second embodiment of the present invention.

In the above embodiment, the monorail system having the first zone A, in which the linear-type accelerator is provided in the vicinity of the respective station 2, was explained. As shown in FIG. 8, the monorail system of the present embodiment is substantially the same as that of the first embodiment except that the first zone A using the linear-type accelerator is formed in the vicinity of one of the stations 20, and a third zone C using a coaster-type accelerator is formed in the vicinity of the other station 21 as the propulsion supplying unit other than the linear-type accelerator. Therefore, duplicate explanations are omitted.

Figure 9:
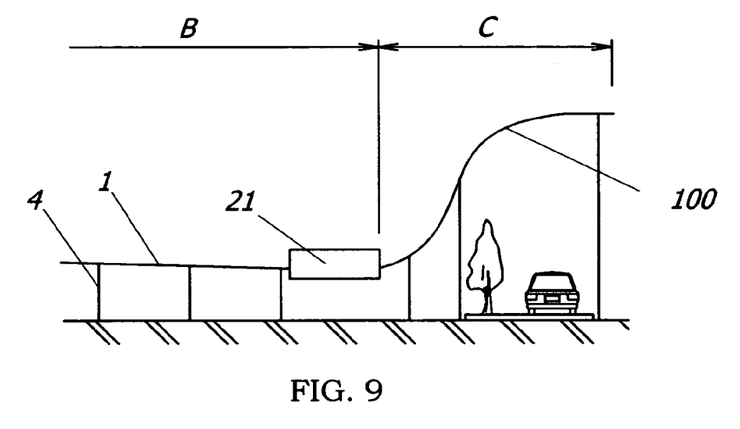
FIG. 9 is a partially enlarged view of the monorail system of FIG. 8.

As shown in FIG. 9, the coaster-type accelerator of this embodiment is mainly composed of an additional rail 100 formed at an uphill gradient in the vicinity of the station, and a lifting device (not shown) fixed at a top end of the additional rail. For example, the lifting device comprises a motor with reduction gears and a chain. Alternatively, the lifting device may be formed with a rope, winding unit, motor with reduction gears, and an elevating table. When the vehicle 3 is lifted up along the additional rail 100 by the lifting device, and then released, it glides on the additional rail 100 toward the station 20, and then comes in the second zone B at a required traveling speed.

According to the monorail system of the present embodiment, the vehicle 3 is allowed to run between the stations (20, 21), as described below. That is, when the vehicle 3 travels from the station 20 toward the station 21, it is accelerated from a stopped condition at the station 20 to a desired traveling speed by the linear-type accelerator of the first zone A. Then, the accelerated vehicle travels in the second zone B by use of the drive unit mounted on the vehicle so as to maintain the traveling speed. Alternatively, when the traveling speed of the accelerated vehicle is equal to or greater than a predetermined value in the second zone B, the vehicle 3 may travel by inertia. When the traveling speed becomes smaller than the predetermined value, the vehicle travels by use of the drive unit mounted thereon. As a result, the vehicle 3 arrives at the station 21 through the second zone B.

On the other hand, when the vehicle 3 travels from the station 21 toward the station 20, the vehicle 3 is lifted up along the additional rail 100 in the third zone C. When the vehicle reaches a required height, it is released from the lifting device, so that the vehicle 3 glides down the additional rail 100. In other words, the vehicle is accelerated to the required speed by gravitation and then comes in the second zone B. The accelerated vehicle travels in the second zone B in the same manner as the case of allowing the vehicle 3 to travel from the station 20 to the station 21. Consequently, the vehicle arrives at the station 20 through the second zone B. At this time, the first zone A functions as an extension of the second zone B rather than the acceleration zone. As shown in FIG. 9, the downside space of the additional rail 100 in the third zone C can be effectively used as a carriageway or a sidewalk.

Thus, when using different accelerating methods in approach and backhaul routes between the stations (20, 21), the passengers of the vehicle can enjoy a moderate entertainment. Therefore, this transportation system is preferable to transport the passengers to an amusement park, or between attractions in the amusement park.

Figure 10:
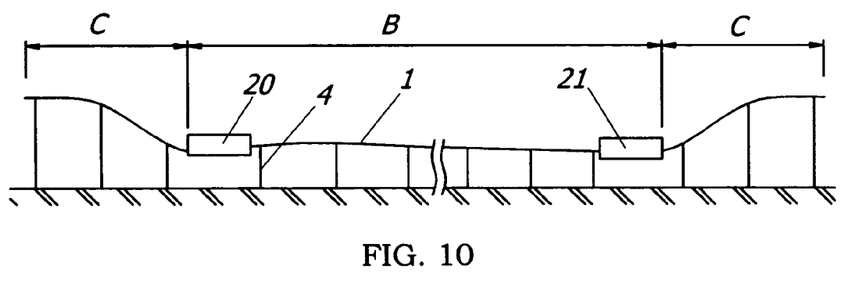
FIG. 10 is a schematic diagram of a monorail system according to a modification of the second embodiment.

As a modification of the present embodiment, as shown in FIG. 10, the third zone C of coaster-type accelerator may be formed at the vicinity of the station 20 in place of the first zone A of the linear-type accelerator.

By the way, when using the coaster-type accelerator to accelerate the vehicle, the vehicle 3 is placed on the slope of the additional rail 100. Therefore, from the viewpoint of achieving a safe and comfortable transportation of the passengers, it is preferred to use a seat posture controller for stably holding the passengers on seats in the vehicle.

Figure 11:
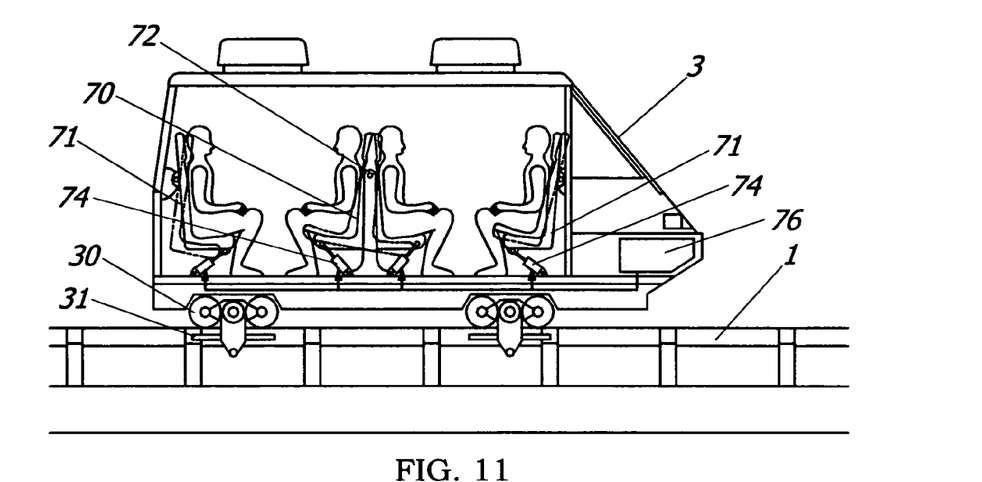
FIG. 11 is a schematic diagram of a seat posture controller provided in the vehicle.

For example, it is preferred to use the seat posture controller shown in FIG. 11. This controller comprises seats (70, 71) pivotally movable in the vehicle, gravity detector 76 for detecting a direction of gravity, and a seat angle adjuster 74 controlled according to an output of the gravity detector 76. The seat 70 is pivotally supported about a fulcrum 72 at a position higher than a center of gravity of the passenger on the seat, e.g., at substantially a shoulder position of the passenger on the seat 70. The seat angle adjuster 74 has a fluid power cylinder or a damper, which is disposed in a space between the seat 70 and the vehicle's floor. The center seat 70 is configured in an inverted T-shape, and supported to be pivotally movable against the floor, as shown by the solid and dotted lines in FIG. 11. In addition, one side of the seat 70 is used for the passengers that face toward the traveling direction, and the other side of the seat 70 is used for the passengers that face toward the opposite direction.

According to the posture controller described above, even when the vehicle 3 is placed on the slope of the additional rail 100 in the third zone C, the seat surface can be always maintained to be substantially perpendicular to the direction of gravity. Therefore, the seat can stably receive the weight of the passenger to provide a comfortable ride quality to the passenger. This seat posture control unit may be used in the transportation system not having the third zone C of the present invention. In place of controlling the seat angle according to the direction of gravity detected by the gravity detector 76, it is also preferred to control the seat angle by detecting a change of acceleration in the traveling direction (longitudinal direction) of the vehicle 3, or an inclination in the transverse direction of the vehicle.

Figure 12:
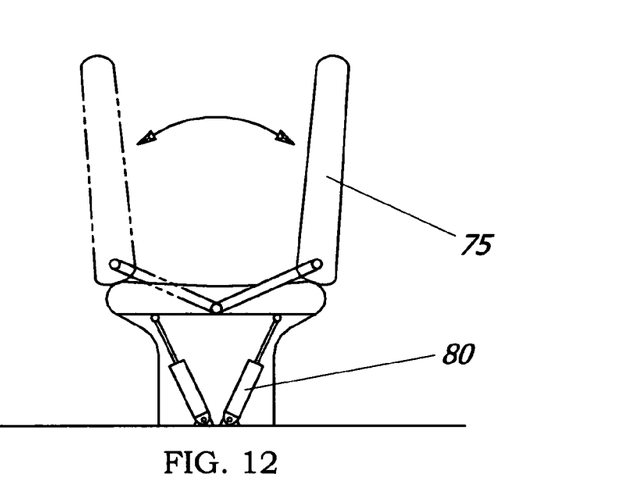
FIG. 12 is a schematic diagram of a backrest adjuster provided in the vehicle.

In addition, as shown in FIG. 12, it is also preferred that the transportation system of the present invention comprises a position adjuster 80 of a backrest 75 of the seat. According to this adjuster, it is allowed for the passengers on the seat to face toward the traveling direction. Therefore, even when the vehicle is suddenly accelerated in the traveling direction, the weight of the passenger is stably received by the backrest, so that the passengers can get the comfortable ride quality. In the case of using the seat with the movable backrest 75, it is also preferred to adopt an automatic adjusting mechanism having the capability of adjusting positions of all of the backrests at a time after all of the passengers get down from the vehicle stopped at the station. According to this mechanism, it is possible to avoid a trouble that the passengers are forced to adjust the positions of the backrests every time of changing the traveling direction, and therefore further improve service to the passengers of the transportation system.

Figure 13:
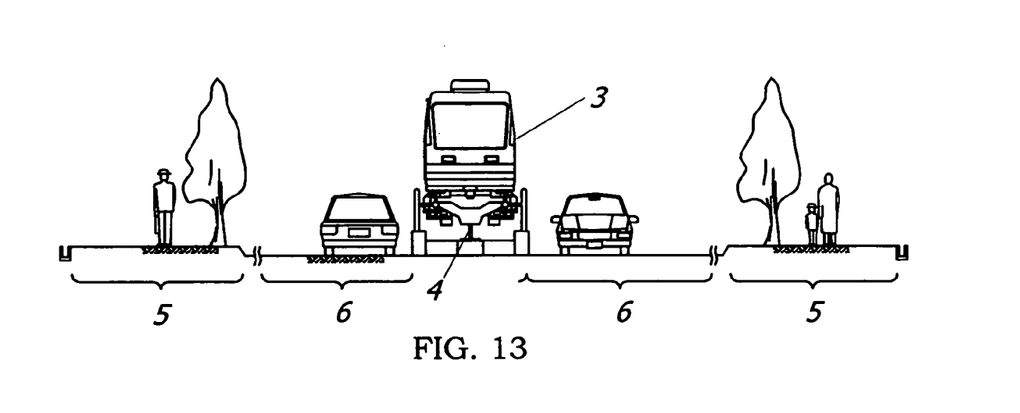
FIG. 13 is a front view of the monorail system of the present invention.

As a further advantage of the present invention, the transportation system is excellent in compatibility with the surrounding environment. For example, as shown in FIG. 2, the rail 1 can be supported by bridge piers 4 having an increased height, which are constructed at a center portion of an existing sidewalk 5. Alternatively, as shown in FIG. 13, the rail 1 may be supported by another bridge piers 4 having a small height, which are constructed at a center divider between adjacent existing carriageways 6. Thus, the transportation system of the present invention can be constructed under a high degree of freedom of design.

INDUSTRIAL APPLICABILITY

As described above, the present invention provides a near-future type of transportation system for safely and comfortably transferring passengers with the advantages of pollution-free and energy conservation, and therefore it is hopefully expected as a new traffic system in urban developments actively performed at landfill sites in recent years. In addition, when the transportation system is constructed at an expensive location, the construction cost can be remarkably saved due to a reduced land area for the construction. Moreover, when the transportation system of the present invention is used to transfer passengers in amusement parks and theme parks, it is possible to provide a moderate entertainment to the passengers by the acceleration zone using the above-described coaster-type accelerator.

Therefore, the present invention is expected to be utilized as the transportation system for connecting between residential and industrial districts or between downtown and airport, which are spaced from each other by a short to middle distance, transportation system for the passengers in the amusement parks and the theme parks, and as the new traffic system in the urban developments for the next generation.

The invention claimed is:

1. A transportation system for allowing a wheeled vehicle to run on its wheels between stations via a track structure formed as a pair of parallel tracks, the transportation system comprising an acceleration zone for accelerating the wheeled vehicle by propulsion supply means provided in the vicinity of the station, and an autonomous traveling zone for allowing the wheeled vehicle accelerated in said acceleration zone to travel on its wheels along the track structure in an autonomous manner without said propulsion supply means, and
a gravity detector for detector for a direction of gravity applied to a seat disposed in the vehicle, and a seat posture controller for controlling a posture of said seat relative to a floor of the vehicle in accordance with an output of said gravity detector,
wherein said propulsion supply means is a linear-type accelerator for accelerating the wheeled vehicle by providing a propulsion force from a first magnet located on the track to a second magnet mounted on the wheeled vehicle.

2. The transportation system as set forth in claim 1, wherein said propulsion supply means provided in the vicinity of one of the stations is said linear-type accelerator, and said propulsion supply means provided in the vicinity of the other station is a coaster-type accelerator comprising a single auxiliary track disposed between the pair of parallel tracks and formed at an uphill gradient in the vicinity of the station, and a lifter for lifting the vehicle on said single auxiliary track, which is provided such that when the wheeled vehicle lifted on said single auxiliary track is released, it is accelerated by gravitation.

3. The transportation system as set forth in claim 1, wherein the vehicle has a flat floor designed in a barrier free manner.

4. A transportation system having a rail structure formed as a pair of parallel tracks and extending between stations, and a wheeled vehicle movable on said rail structure via the wheels of the vehicle and carrying drive means, the transportation system comprising a first zone for accelerating the wheeled vehicle from a stopped condition to a required speed by a propulsion force supplied from propulsion supply means located from one of the stations toward the other station by a predetermined distance, and a second zone not having said propulsion supply means, in which the wheeled vehicle accelerated in the first zone travels on said rail by a propulsion force supplied from said drive means, and
a gravity detector for detecting a direction of gravity applied to a seat disposed in the vehicle, and a seat posture controller for controlling a posture of said seat relative to a floor of the vehicle in accordance with an output of said gravity detector,
wherein said propulsion supply means is a linear-type accelerator for accelerating the wheeled vehicle by providing a propulsion force from a fixed magnet located along said rail structure to a movable magnet mounted on the wheeled vehicle.

5. The transportation system as set forth in claim 4, wherein said drive means comprises a drive wheel driven by a motor mounted on the wheeled vehicle, and a single auxiliary rail formed in said second zone in parallel with said rail structure and disposed between the pair of parallel tracks such that said drive wheel travels thereon.

* * * * *